United States Patent
Hampton et al.

(10) Patent No.: US 9,409,115 B2
(45) Date of Patent: Aug. 9, 2016

(54) FILTER WITH EXTERIOR AND INTERIOR MEDIA COMPONENTS AND METHOD OF FILTERING

(75) Inventors: John R. Hampton, Pinehurst, TX (US); Greg P Wallace, Katy, TX (US)

(73) Assignee: Filtration Technology Corporation, Houston, TX (US)

(\*) Notice: Subject to any disclaimer, the term of this patent is extended or adjusted under 35 U.S.C. 154(b) by 657 days.

(21) Appl. No.: 12/743,800

(22) PCT Filed: Nov. 17, 2008

(86) PCT No.: PCT/US2008/083824
§ 371 (c)(1),
(2), (4) Date: Aug. 16, 2010

(87) PCT Pub. No.: WO2009/067411
PCT Pub. Date: May 28, 2009

(65) Prior Publication Data
US 2010/0300991 A1    Dec. 2, 2010

Related U.S. Application Data

(60) Provisional application No. 60/989,338, filed on Nov. 20, 2007.

(51) Int. Cl.
*B01D 29/50* (2006.01)
*B01D 29/56* (2006.01)
*B01D 29/54* (2006.01)
*B01D 46/52* (2006.01)
*B01D 46/00* (2006.01)
*B01D 29/21* (2006.01)
*B01D 24/08* (2006.01)
*B01D 46/24* (2006.01)

(52) U.S. Cl.
CPC ............. *B01D 46/521* (2013.01); *B01D 24/08* (2013.01); *B01D 29/21* (2013.01); *B01D 46/0021* (2013.01); *B01D 46/0023* (2013.01); *B01D 46/2411* (2013.01); *B01D 2201/122* (2013.01)

(58) Field of Classification Search
None
See application file for complete search history.

(56) References Cited

U.S. PATENT DOCUMENTS

| | | |
|---|---|---|
| 1,690,564 A | 11/1928 | Ward |
| 1,742,768 A | 1/1930 | Kamrath |
| 1,861,576 A | 6/1932 | Liddell |

(Continued)

FOREIGN PATENT DOCUMENTS

| | | | |
|---|---|---|---|
| EP | 2219765 | 8/2010 | |
| WO | WO2006/107721 | 10/2006 | |
| WO | WO 2009067411 A1 * | 5/2009 | ............ B01D 29/21 |

*Primary Examiner* — Robert James Popovics
(74) *Attorney, Agent, or Firm* — Boulware & Valoir

(57) ABSTRACT

The invention features a filtration segment having a top seal, a bottom seal and a primary filter core and the method of filtering with the design of the filtration segment. The primary filter core is operatively coupled to at least one opening which is located either on the top seal or on the bottom seal. The filtration segment also includes one or more interior filters surrounding the primary filter core. Each interior filter includes a filter material surrounding a secondary core which is operatively coupled to at least one opening which is located either on the top seal or on the bottom seal. Each filter may optionally include a retaining medium enclosing the filter material. The filtration segment has one or more layers of an exterior filter media which operatively surround the interior filters and are operatively coupled to the top seal and the bottom seal.

11 Claims, 17 Drawing Sheets

(56) References Cited

U.S. PATENT DOCUMENTS

| | | | |
|---|---|---|---|
| 2,255,937 | A | 9/1941 | McNamara |
| 2,864,505 | A | 12/1958 | Kasten |
| 3,020,977 | A | 3/1962 | Huppke et al. |
| 3,237,771 | A | 3/1966 | Greenawalt |
| 3,268,442 | A * | 8/1966 | Pall et al. ............ 210/702 |
| 3,361,260 | A | 1/1968 | Buckman |
| 3,668,837 | A | 6/1972 | Gross |
| 3,739,916 | A | 6/1973 | Cub et al. |
| 4,092,246 | A | 5/1978 | Kummer |
| 4,154,688 | A | 5/1979 | Pall |
| 4,406,787 | A | 9/1983 | Süto et al. |
| 4,439,321 | A | 3/1984 | Taki et al. |
| 4,609,466 | A | 9/1986 | McCausland et al. |
| 4,640,779 | A | 2/1987 | Taki et al. |
| 4,664,812 | A | 5/1987 | Klein |
| 4,681,605 | A | 7/1987 | Gollan |
| 4,738,778 | A | 4/1988 | Taki et al. |
| 4,824,564 | A * | 4/1989 | Edwards et al. ............ 210/232 |
| 4,892,667 | A | 1/1990 | Parker, III et al. |
| 4,898,670 | A | 2/1990 | Gollan |
| 4,909,937 | A | 3/1990 | Hoffmann et al. |
| RE33,502 | E | 12/1990 | Gollan |
| 5,092,990 | A | 3/1992 | Muramatsu et al. |
| 5,160,442 | A * | 11/1992 | Hampton et al. ............ 210/791 |
| 5,232,595 | A | 8/1993 | Meyer |
| 5,266,195 | A | 11/1993 | Hopkins |
| 5,470,469 | A | 11/1995 | EcKman |
| 5,543,047 | A | 8/1996 | Stoyell et al. |
| 5,824,232 | A * | 10/1998 | Asher et al. ............ 210/787 |
| 6,030,531 | A | 2/2000 | Gershenson |
| 6,238,560 | B1 | 5/2001 | Gershenson |
| 6,841,007 | B1 * | 1/2005 | Howard et al. ............ 134/8 |
| 7,323,106 | B2 | 1/2008 | Jaroszczyk et al. |
| 8,147,693 | B2 * | 4/2012 | Terry et al. ............ 210/338 |
| 2004/0020871 | A1 * | 2/2004 | Hampton et al. ............ 210/799 |
| 2004/0149647 | A1 * | 8/2004 | Hampton et al. ............ 210/497.01 |
| 2006/0102533 | A1 | 5/2006 | Faria |
| 2010/0300991 | A1 * | 12/2010 | Hampton et al. ............ 210/806 |

\* cited by examiner

FILTER WITH EXTERIOR AND INTERIOR MEDIA COMPONENTS AND METHOD OF FILTERING

CROSS-REFERENCE TO RELATED APPLICATIONS

This application is a 35 U.S.C. Section 371 of PCT/US2008/0083824 filed Nov. 17, 2008, which claims priority to U.S. Provisional Application No. 60/989,338 filed on Nov. 20, 2007, which are incorporated in their its entirety by reference.

BACKGROUND

This invention generally relates to the field of fluid filtration.

Filters and methods of filtration are widely utilized in a number of commercial and industrial applications and also in laboratory, clinical and residential settings. Such filters and methods may be used to purify fluids (e.g., liquids and gases) and to extract compounds (e.g., fluids and solids) contained in the fluids.

The present invention presents a unique design and method for fluid filtration.

SUMMARY OF THE INVENTION

In general, the invention features a filtration segment having a top seal, a bottom seal and a primary filter core. The primary filter core is operatively coupled to at least one opening which is located either on the top seal or on the bottom seal. The filtration segment also includes one or more interior filters surrounding the primary filter core. Each interior filter includes a filter material surrounding a secondary core which is operatively coupled to at least one opening which is located either on the top seal or on the bottom seal. Each filter may also include a retaining medium of a rigid or semi-rigid support surrounding the inside, outside or both sides of the filter material. The filtration segment has one or more layers of an exterior filter media surrounding the interior filters and are operatively coupled between the top seal and the bottom seal. The exterior filter media may be supported by a rigid or semi-rigid material to maintain its integrity. The method generally involves flowing a fluid around the exterior filter media while at the same time flowing the remaining fluid through the cores of the interior filters. The seals prevent the fluid from passing into the primary filter core which can be cylindrical fluid permeable material or a void formed by the space outside the interior filters and inside the exterior filter media.

The method can also include the reverse flow. The unfiltered fluid passed from the interior of the outer filter media to the exterior while at the same time part of the fluid to be filters passes from the interior to the exterior of the interior filters. The filtered fluid collects outside the flirtation segments which can be in a housing.

DETAILED DESCRIPTION OF THE DRAWINGS

DETAILED DESCRIPTION OF THE INVENTION

Figure 1A:
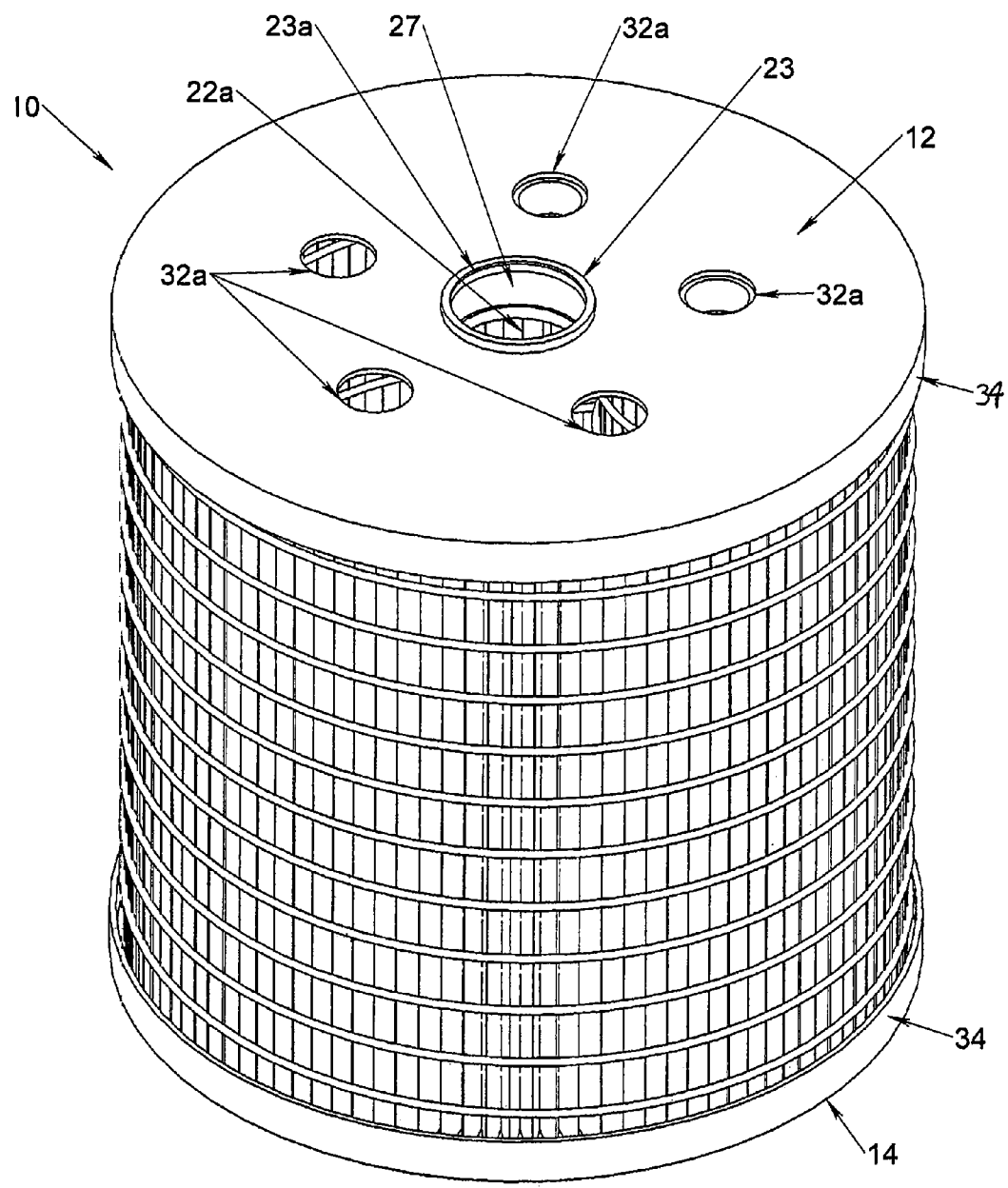
FIG. 1A is a perspective view of an embodiment of a filtration segment showing the top seal.
Figure 1B:
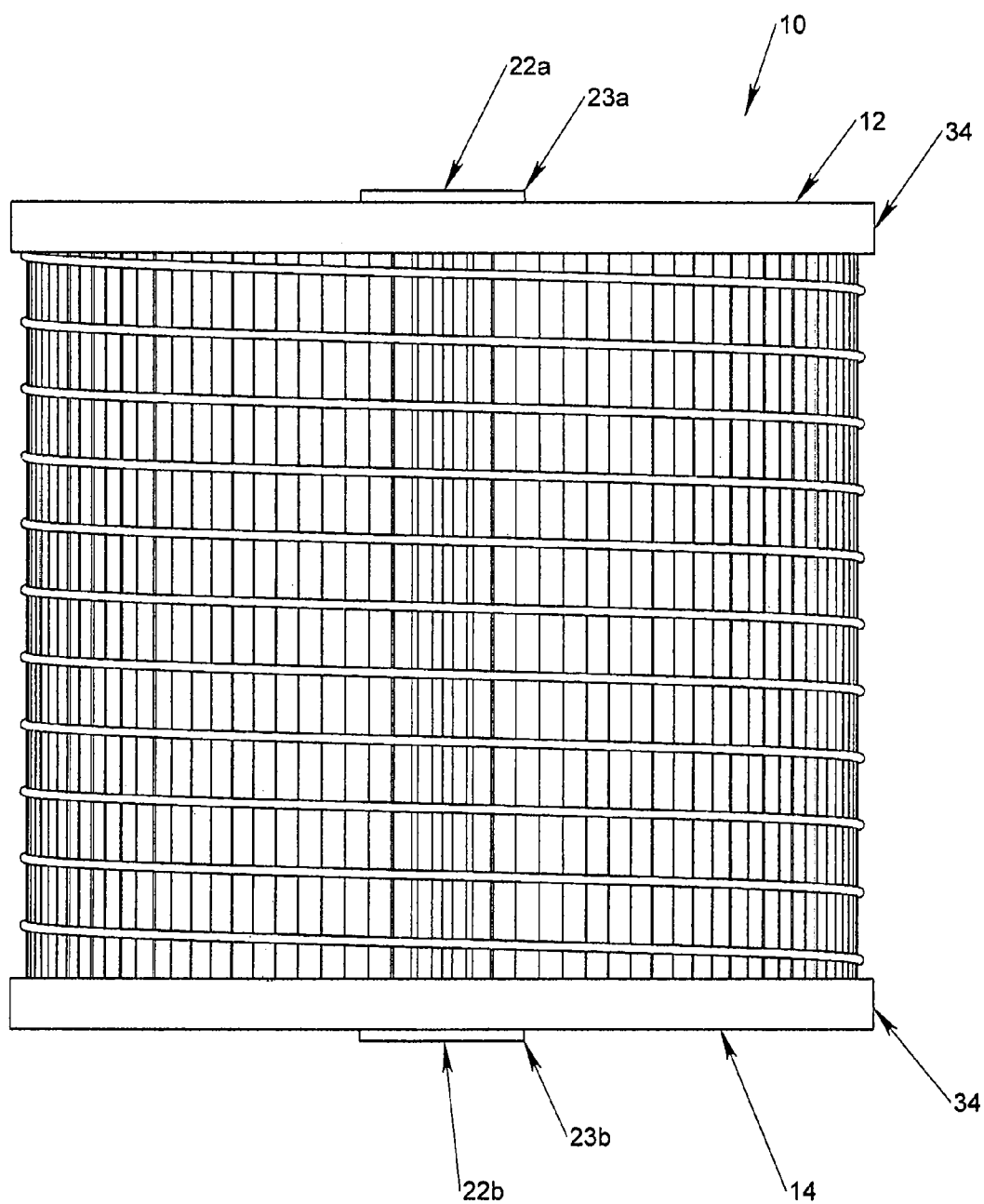
FIG. 1B is a side view of the filtration segment of FIG. 1A.

FIGS. 1A and 1B depict one embodiment of the present invention. FIG. 1A is a top perspective view of a filtration segment 10 sealed at opposite-ends by a top seal member 12 and a bottom seal member 14. FIG. 1B is a side view of the filtration segment 10 as shown in FIG. 1A. In this embodiment, the top seal member 12 includes a primary opening 22a, which generally occupies the center portion of the top seal member 12, as well as one or more secondary openings 32a, which are generally arranged in a circular pattern surrounding the primary opening 22a. To facilitate the sealing of the primary opening 22a by a top cap 40 (not shown in FIGS. 1A and 1B, but shown in FIG. 2B), or to facilitate the stacking of multiple filtration segments 10 on top of one another (which will be discussed in more detail in FIGS. 6 and 7 below), in a preferred embodiment, a ring-shaped flange 23a is provided around the primary opening 22a. Preferably, the flange 23 extends both upwardly from the surface of the top seal member 12 and downwardly into the body of the filtration segment 10, so as to form a sealing/coupling surface 27 for receiving a top cap 40 or a stacking adaptor 70 as will be discussed in more detail below.

Similarly, in this embodiment, the bottom seal member 14 has a primary opening 22b (as shown in FIG. 1B, one or more secondary openings 32b (not shown in FIGS. 1A and 1B, but shown in FIG. 2B), as well as a ring-shaped flange 23b. The positions of the primary opening 22b and the secondary opening 32b in the bottom seal member 14 generally correspond to the positions of the primary opening 22a and the secondary opening 32a in the top seal member 12.

The top seal member 12 and the bottom seal member 14 are preferably made of materials that are impermeable to the fluids that are to be filtered. The top seal member 12 and the bottom seal member 14 each may have a lip 34 extending over the edge of the exterior filter 16. The lips 34 help maintain the shape of exterior filter 16 of the filtration segment 10.

Figure 2A:
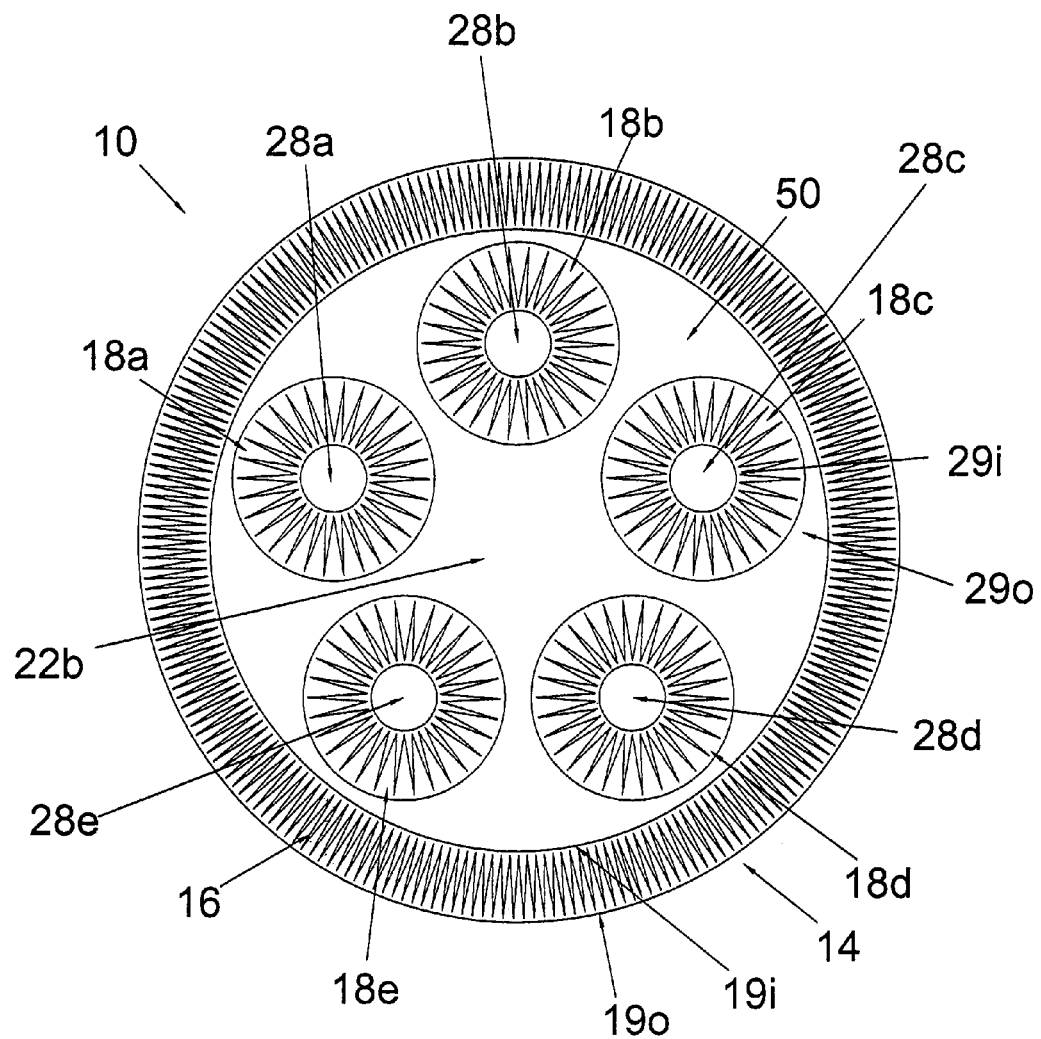
FIG. 2A is a cross-sectional view of an embodiment of the filtration segment of FIG. 1B.
Figure 2B:
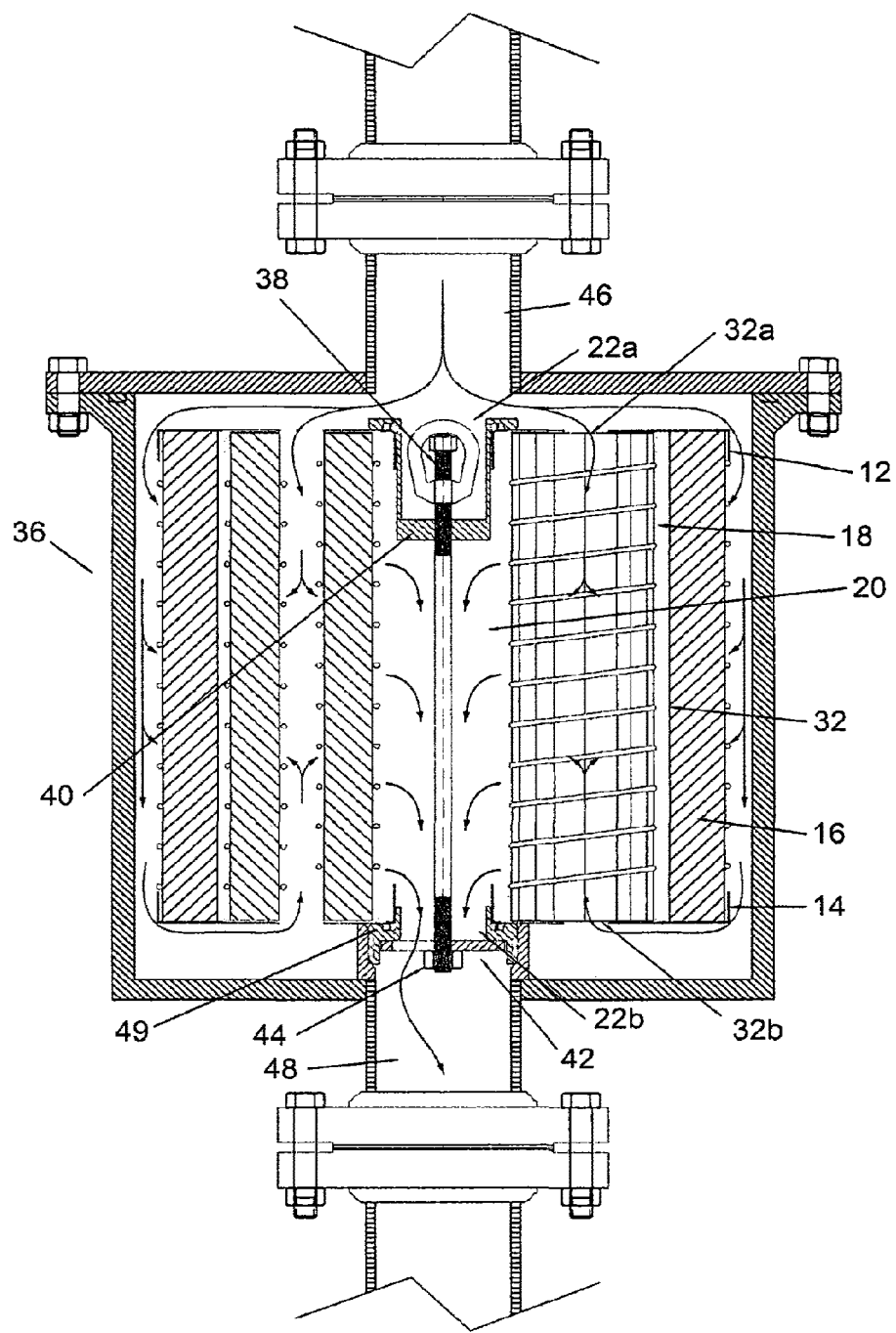
FIG. 2B is a cross-sectional side view of the filtration segment of FIG. 1A in an embodiment of use showing an outside-in flow path.
Figure 2C:
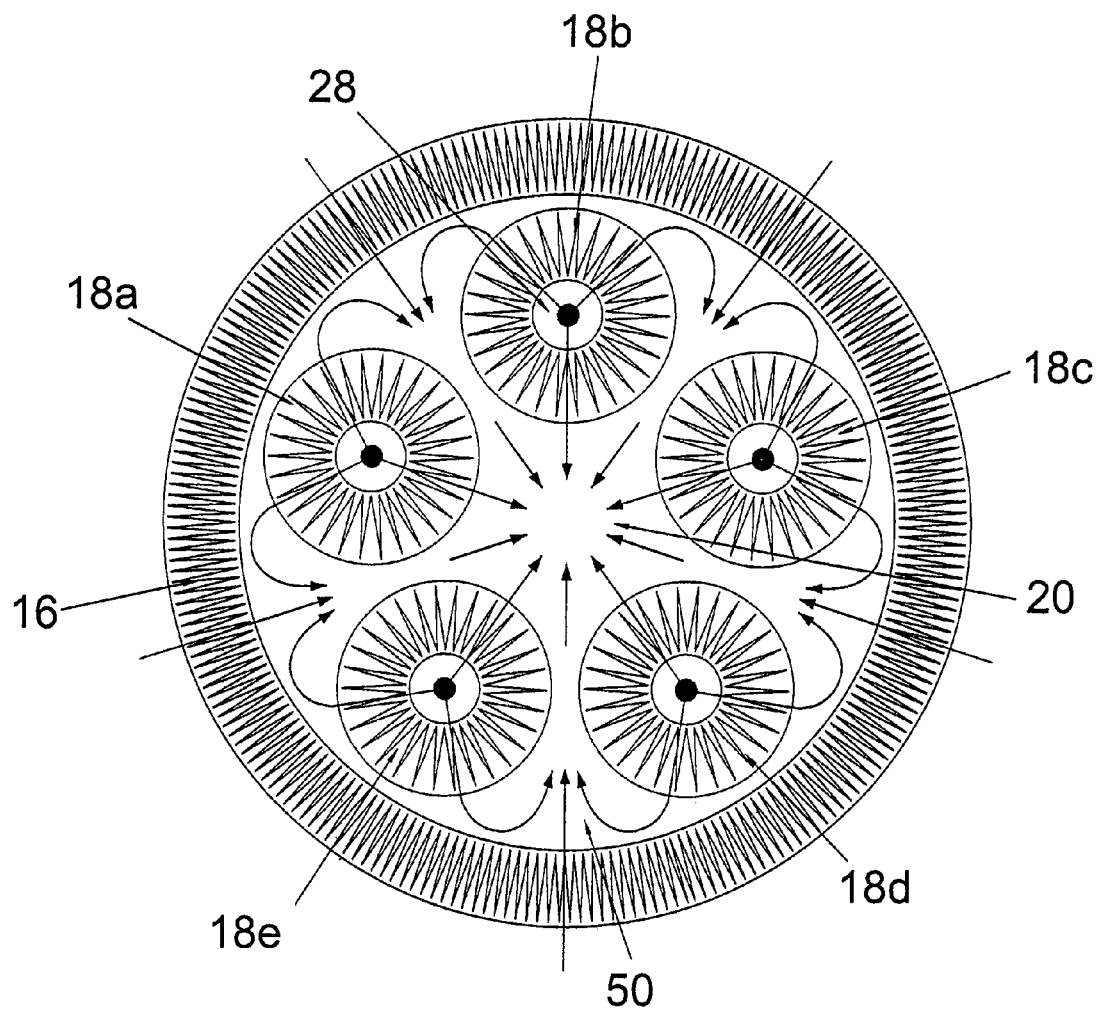
FIG. 2C is a cross-sectional top view of the filtration segment of FIG. 2B showing an outside-in flow path.
Figure 5A:
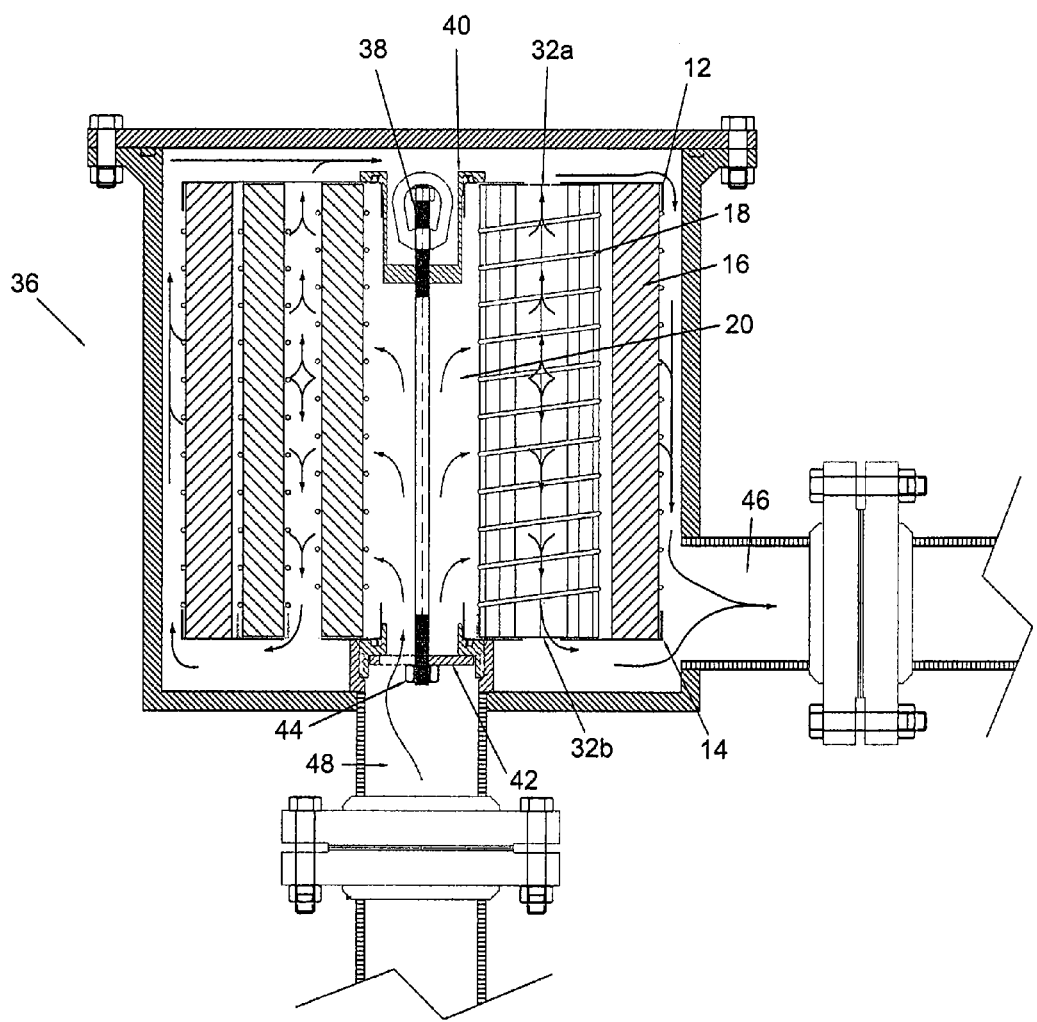
FIG. 5A is a cross-sectional side view of the filtration segment in an alternate embodiment of use showing an inside-out flow path.
Figure 5B:
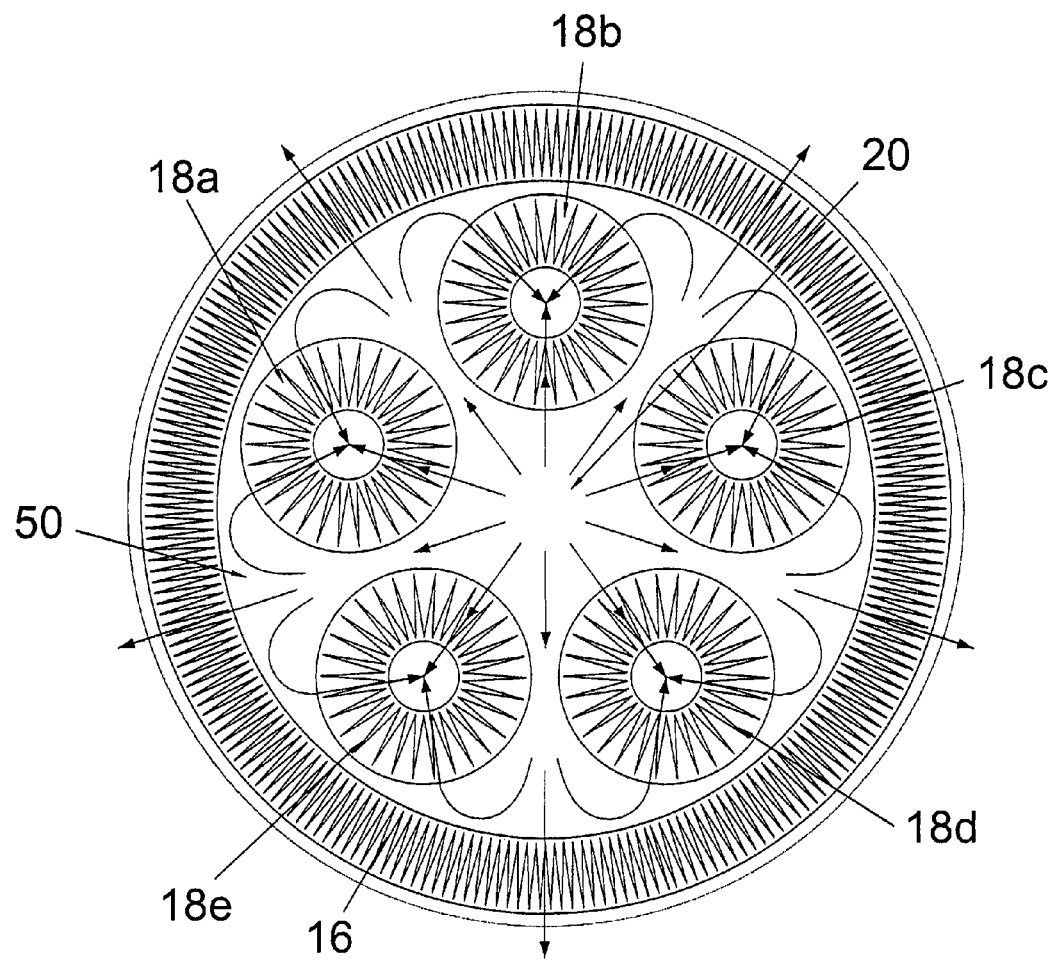
FIG. 5B is a cross-sectional top view of the filtration segment of FIG. 5A showing an inside-out flow path.

FIGS. 2A-2C depict the cross-sectional views of a filtration segment 10 according to one embodiment of the current invention. In particular, FIG. 2A is a cross-sectional top view of the filtration segment 10. FIG. 2B is a cross-sectional side view of the filtration segment 10 of FIG. 1. FIG. 2C is another cross-sectional top view of the filtration segment 10. FIGS. 2B and 2C show one use of the present invention wherein liquids are filtered and then collected at the center portion of the filtration segment 10. Another use of the present invention wherein liquids are filtered and then collected at the peripheral portion of the filtration segment 10 is depicted in FIGS. 5A and 5B below.

Referring to FIG. 2A, in one embodiment of the current invention, the filtration segment 10 includes an exterior filter 16 and one or more interior filters 18 (18a, 18b, 18c, etc.). The exterior filter 16 encloses the interior filters 18. The total number of the interior filters 18 equals to the total number of the secondary openings 32, and the positions of the interior filters 18 correspond substantially to those of the secondary openings 32a and 32b located on the top seal member 12 and bottom seal member 14, respectively. Therefore, when the filtration segment 10 is properly assembled, the top seal member 12 covers the upper ends of the exterior filter 16 and the interior filters 18, the bottom seal member 14 covers the lower ends of the exterior filter 16 and the interior filters 18, and the interior filters 18 are in fluid communication with the secondary openings 32a and 32b. Although the cross-sectional shapes of the exterior filter 16 and interior filters 18 are shown as being circular, any cross-sectional shape may be used.

In some embodiments, each of the filters (i.e. exterior filter 16 and the interior filters 18) comprises a filter media situated between two concentrically arranged cages. Accordingly, with respect to the exterior filter 16, the filter media is positioned between an outer cage 19o and an inner cage 19i; with respect to each of the interior filters 18, the filter media is positioned between an outer cage 29o and an inner cage 29i. The cages help to maintain the structural integrity of the filters. The cage may also be beneficial when the filtration system is in the reverse flow pattern as discussed in FIGS. 5A and 5B below.

However, it is not always necessary to use two cages to house the filter media. Depending on the material and structure of the filter media, and factors such as the pressure to be used in the filtration system, more or less cages can be used in the current invention. For example, in some embodiments, only one cage is needed for each filter, and such single cage can be either an outer cage (such as 19o or 29o) or an inner cage (such as 19i or 29i). In some other embodiments, no cage is needed at all. One example is when pleated metal is used as the filter media in the filtration segment. Because pleated metal is capable of maintaining its physical structure under most circumstances, it is often not necessary to use cages to retain the media.

People skilled in the art can readily perceive that filters with none, one or more cages can be mix-matched in a single filtration segment, depending on the particular demands of each filtration process. For example, in one embodiment, an outer cage is provided for the exterior filter 16, but no cage is provided for the interior filters 18. All such variations are within the scope of the current invention.

The cages shown are illustrative of the use of a rigid or semi-rigid support such a synthetic netting support that allows fluid flow through the media. Any type of material that supports the filter media and allows fluid flow may be used.

The cages 19 or 29 can be in various forms. In some embodiments, the cages are shaped as springs or concentric rings. In some other embodiments, the cages are in the form of fluid permeable sleeves that support the filter media, polymer meshes, or cinch straps. In a preferred embodiment where pleated metal is used as the filter media, the housing cage is in the form of a metal spring. In a preferred embodiment when pleated non-metal is used, the preferred cage is a synthetic mesh.

Various forms of filter media can be used in the current invention. Examples include, but are not limited to, pleated media, spun media, granular media, solid media and other media known to those skilled in the art. Similarly, various types of materials can be used in the current invention, including, but not limited to, metal, fiberglass, cellulose, synthetic media such as polypropylenes, or polyethylene, polyester, cloth, paper, nylon, orlon, teflon and combinations thereof. In one preferred embodiment, the filter media is made of pleated synthetic media. The filter segment may be single use and disposable or reusable.

FIG. 2B shows a longitudinal cross-sectional view of the filtration segment 10 secured in a housing 36 according to one embodiment of the invention. The filtration segment 10 may be secured in the housing 36 by an assembly including a rod 38, a top cap 40, a bottom cap 42, a nut 44, and a post 49. The rod 38 is inserted through the primary opening 22a, an opening in the top cap 40, the primary opening 22b and an opening in the bottom cap 42. The rod 38 can be secured by a nut 44 or any other means known in the art. Fluids may enter the housing 36 via an inlet 46 and exit via an outlet 48. The fluids may be pressurized or may flow by gravity. Preferably, the fluid is under pressure so that it flows more smoothly and efficiently.

The top cap 40 seals the primary opening 22a. In one embodiment, the seal is achieved by engaging the top cap 40 in close contact with the ring-shaped flange 23a (not shown) and/or the sealing surface 27 (not shown) as depicted in FIG. 1A above. Consequently, fluids entered from the inlet 46 of the housing 36 will not be able to access the inside of the filtration segment 10 via the primary opening 22a. Similarly, at the bottom of the filtration segment 10, the post 49 also forms a seal around the primary opening 22b, so that unfiltered fluids entered from the inlet 46 of the housing 36 may not flow along the peripherals of the filtration segment to the bottom of the filtration segment 10 to access the inside of the filtration segment 10 via the primary opening 22b.

As shown in FIGS. 2A and 2B, there can be multiple interior filters 18a, 18b, 18c, 18d and 18e which, according to some embodiments of the invention, are spaced in such a manner that they collectively surround an area that is generally along the central axis of the exterior filter 16. This area is referred to as the primary filter core 20, which extends from the primary opening 22a in the top seal member 12 to the primary opening 22b in the bottom seal member 14. The exterior filter 16 can be secured to the top seal 12 and bottom seal 14 by o-rings (not shown) disposed between the edges of seals surrounding the top and bottom portion of the filter 16. This modification facilitates construction of the filter segment. In a preferred embodiment, the primary filter core 20 is simply a void. Alternatively, the primary filter core 20 is a cylindrical tube with perforations or a cylindrical tube made of a fluid permeable material. In the embodiment as shown in FIG. 2B, the primary filter core 20 is a void. The upper end of the opening to the primary filter core 20 is sealed by the top cap 40 and the lower end of the primary filter core 20 is in fluid communication with the outlet 48 via perforations in the bottom cap 42.

Similarly, a secondary filter cores 28*a-e* can be formed along the central axis in each of the interior filters 18. The upper end of the secondary filter core 28 is in communication with an opening 32*a* in the top seal member 12. The lower end of the secondary filter core 28 is in communication with an opening 32*b* in the bottom seal member 14.

As shown by the arrows in FIGS. 2B and 2C, in a preferred embodiment, the unfiltered fluid enters the filter assembly via the inlet 46. The fluid then flows through one of the following two filtration routes:

The fluid first enters the secondary filter cores 28 of the interior filters 18 via the openings as shown at 32*a* in top seal 12, passes through the filter media of interior filters 18 from the inside of the filter to the outside of the filter, then enters into the various voids 50 in the filtration segment 10, and is eventually collected in the primary filter core 20 in communication with the voids 50.

The fluid first flows along the inner walls of the housing 36 to the peripheral area surrounding the exterior filter 16, then passes through the exterior filter 16 from the outside of the filter to the inside of the filter, enters into the various voids 50 in the filtration segment 10, and is eventually collected in the primary filter core 20.

Figure 2D:
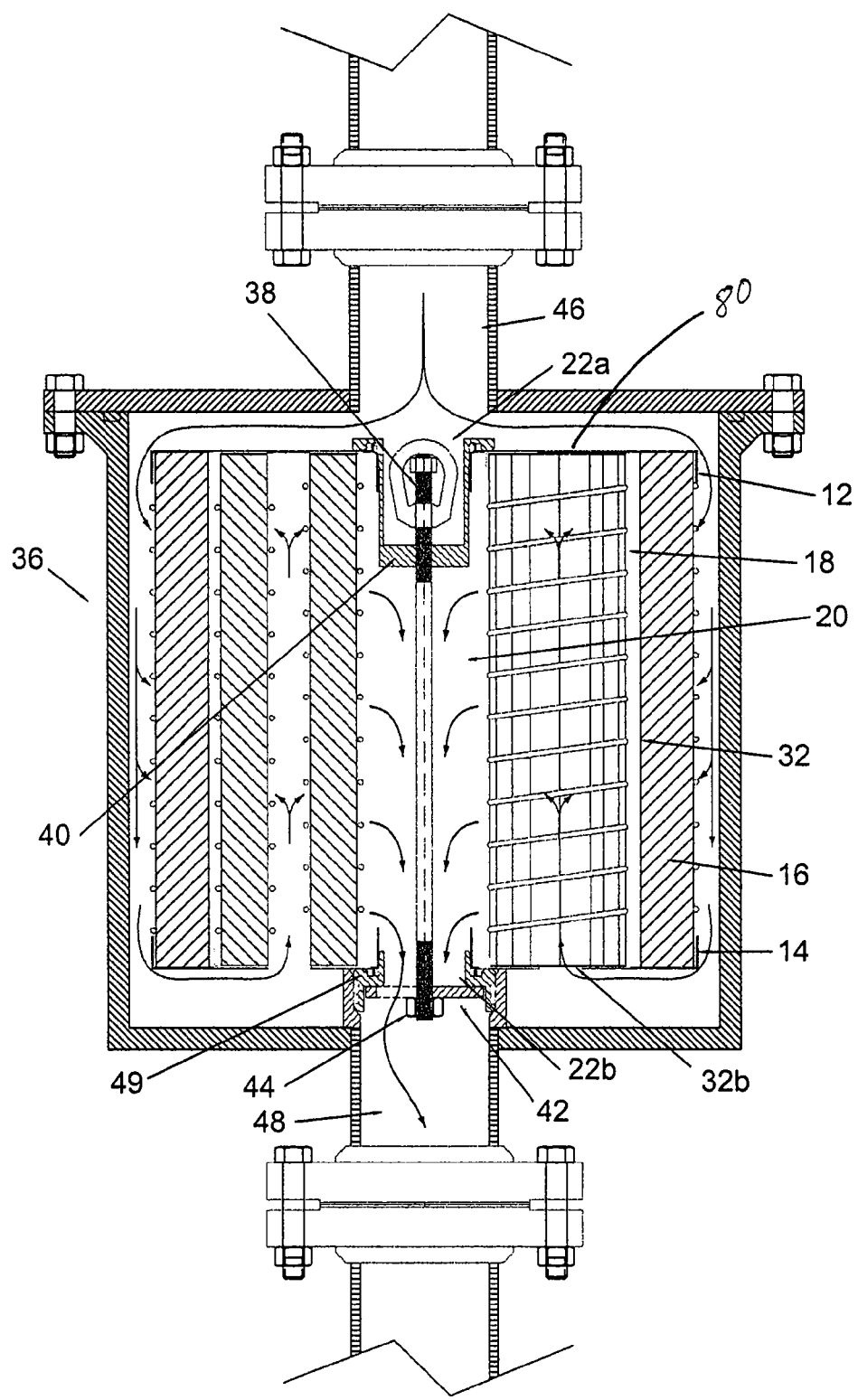
FIG. 2D is a cross-sectional side view with no openings in the top seal.

FIG. 2D is a variation of the filter segment 36 where top seal 80 has no openings for fluid flow into interior filters 18. The fluid flow enters the interior filters only from the opening in the bottom seal 14. Otherwise the filtration is the same as shown in 2B and 2C.

There may be one or more voids 50 in the filtration segment 10. The number and shape of voids 50 depend upon the shape, size and arrangement of the interior filters 18. The voids 50 are in communication with primary filter core 22. All filtered fluids collected in the primary filter core 20 then pass through the bottom cap 42 and exit the filter assembly via the outlet 48.

Figure 3:
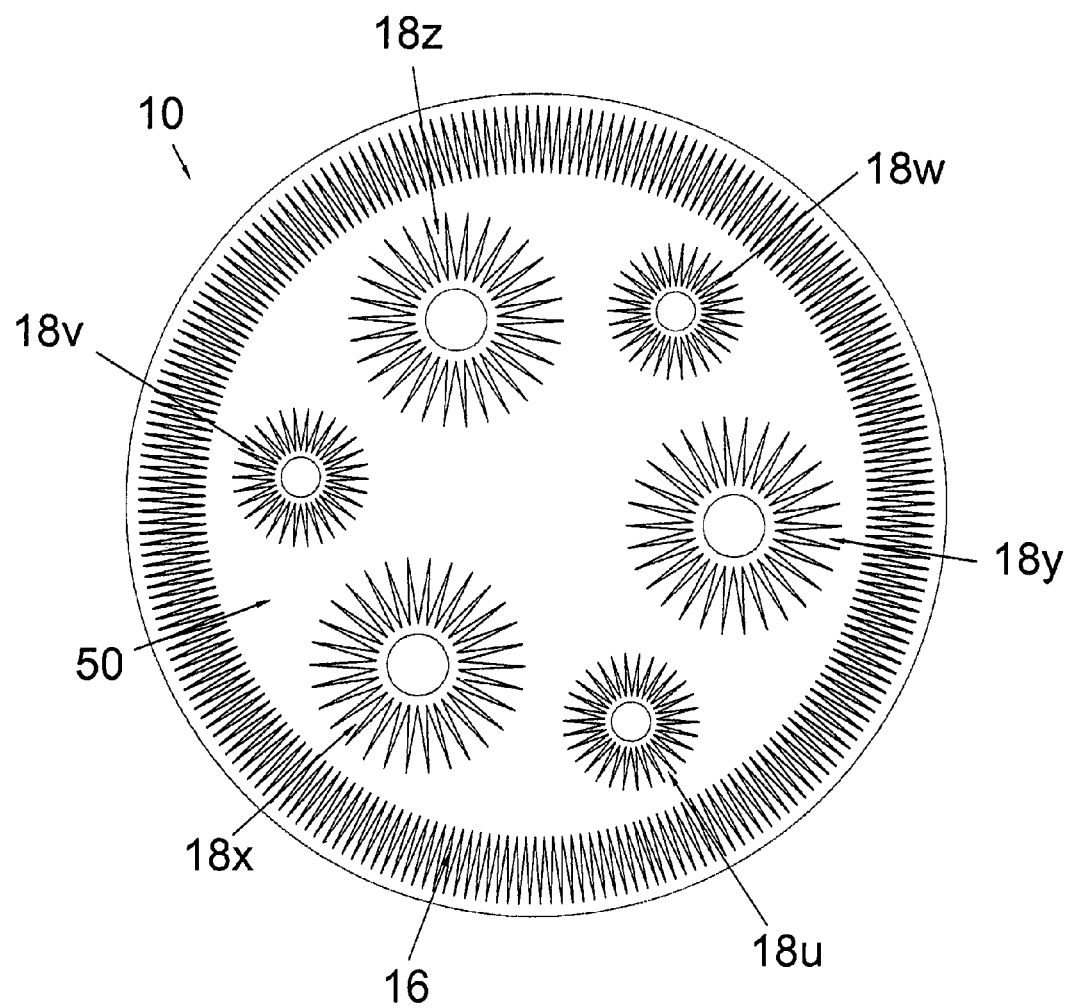
FIG. 3 is a cross-sectional top view of an alternate embodiment of the filtration segment of FIG. 1A with different size interior filters.

FIG. 3 illustrates an alternate embodiment of the filtration segment 10 having the interior filters 18 with two different diameters. Interior filters 18*u*, 18*v* and 18*w* are smaller than interior filters 18*x*, 18*y* and 18*z*. In some embodiments, all the interior filters 18 may be of different diameters, shapes or sizes. Also shown in FIG. 3 is an embodiment where no cage is provided for the interior and exterior filters.

Figure 4:
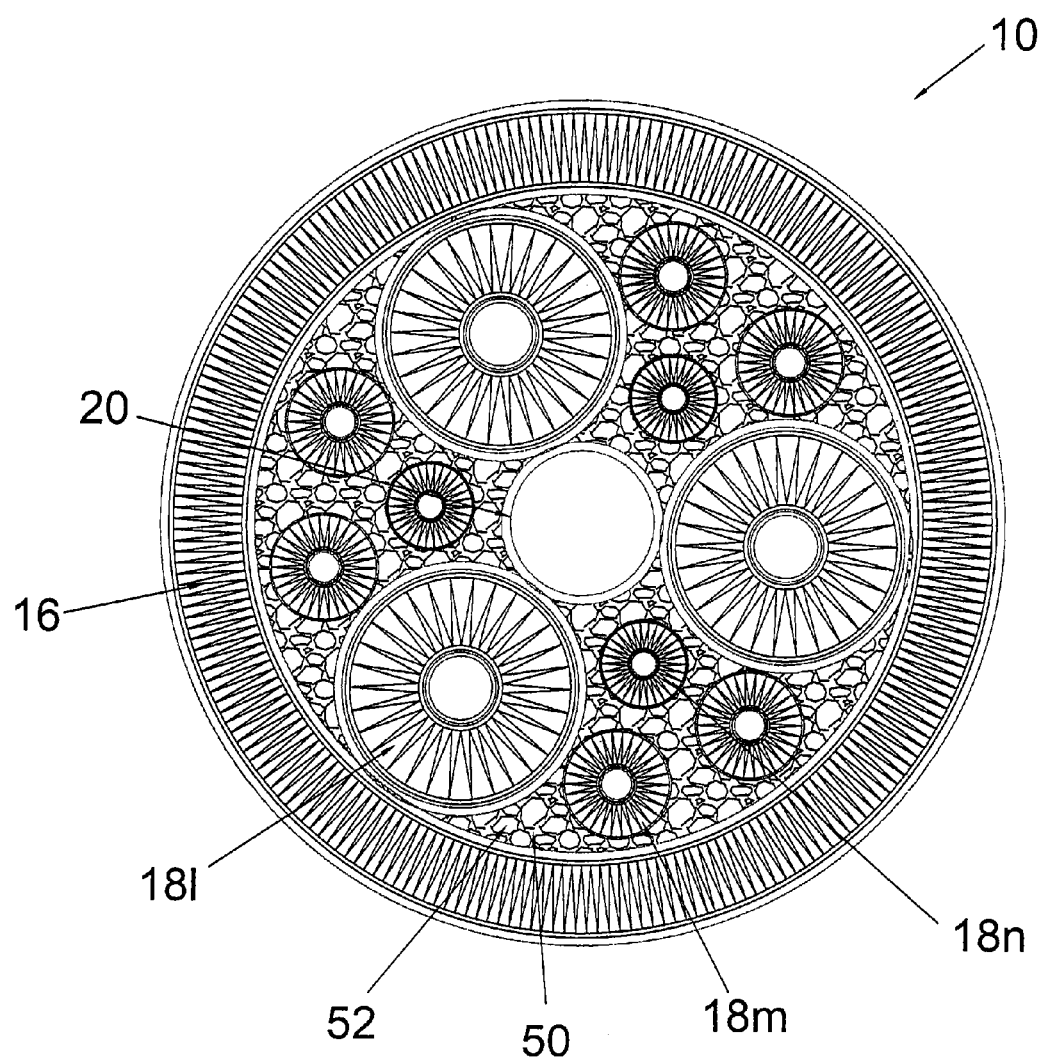
FIG. 4 is a cross-sectional top view of another alternate embodiment of the filtration segment of FIG. 1A with granular material.

FIG. 4 illustrates an embodiment of the filtration segment 10 with various sizes of interior filters 18. Also shown is an embodiment where a filter media 52 is used to fill the voids 50 of the filtration segment 10. The filter media 52 may be granular, such as carbon. Alternatively, it can be any other filter media or combination thereof. The filter media generally fills and is distributed in the void 50 defined by the exterior filter 16 and the interior filters 18. If the filter media 52 is a granular media, the primary filter core 20 is preferably a cylindrical tube with fine perforations or a cylindrical tube made of a fluid permeable material, so that the granular filter media 52 is prevented from entering the primary filter core 20 to contaminate the clean fluid.

FIGS. 5A and 5B detail a flow pattern that is the reverse of the above described with the fluid entering the inside of primary core. FIGS. 5A and 5B also depict an alternate embodiment of the housing 36, wherein the outlet 46 is positioned on the side of the housing and instead of on the top. In this embodiment, the fluid enters through the opening 48 on the housing 36 and the bottom cap 42 into the primary filter core 20. The fluid then enters the voids 50, and passes through either the exterior filter 16 or an interior filter 18. In the later event, the fluid exits the interior filter 18 via the opening 32*a* and 32*b* of the secondary filter core 28. The fluid then exits the housing 36 via the outlet 46. The reverse flow pattern can be used to remove the impurities deposited on the filters after using the filtration segment 10 in the normal flow pattern for a period of time. The reversed flow pattern also helps to clean the filtration segment for reuse.

Figure 6:
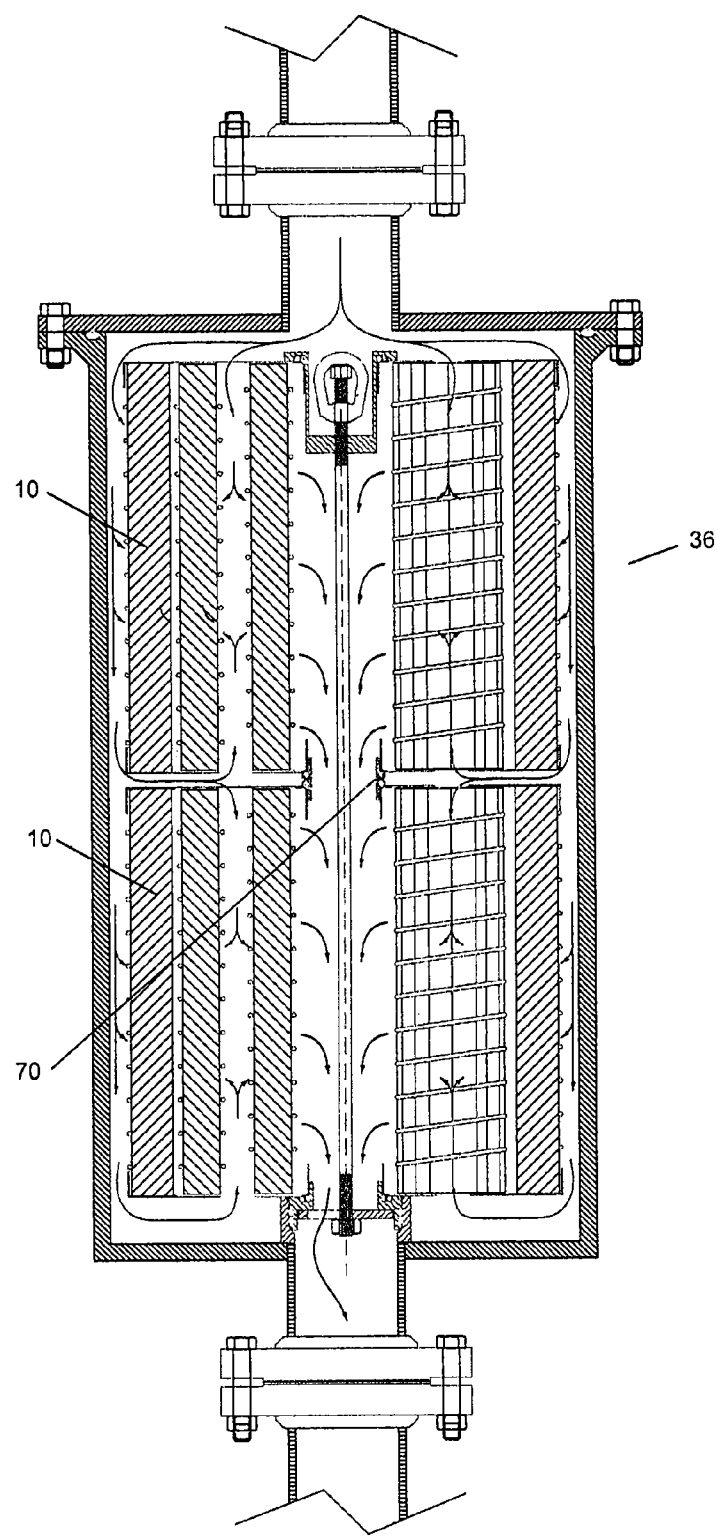
FIG. 6 is a cross-sectional side view of the filtration segment in a double stack arrangement with an outside-in flow path.
Figure 7:
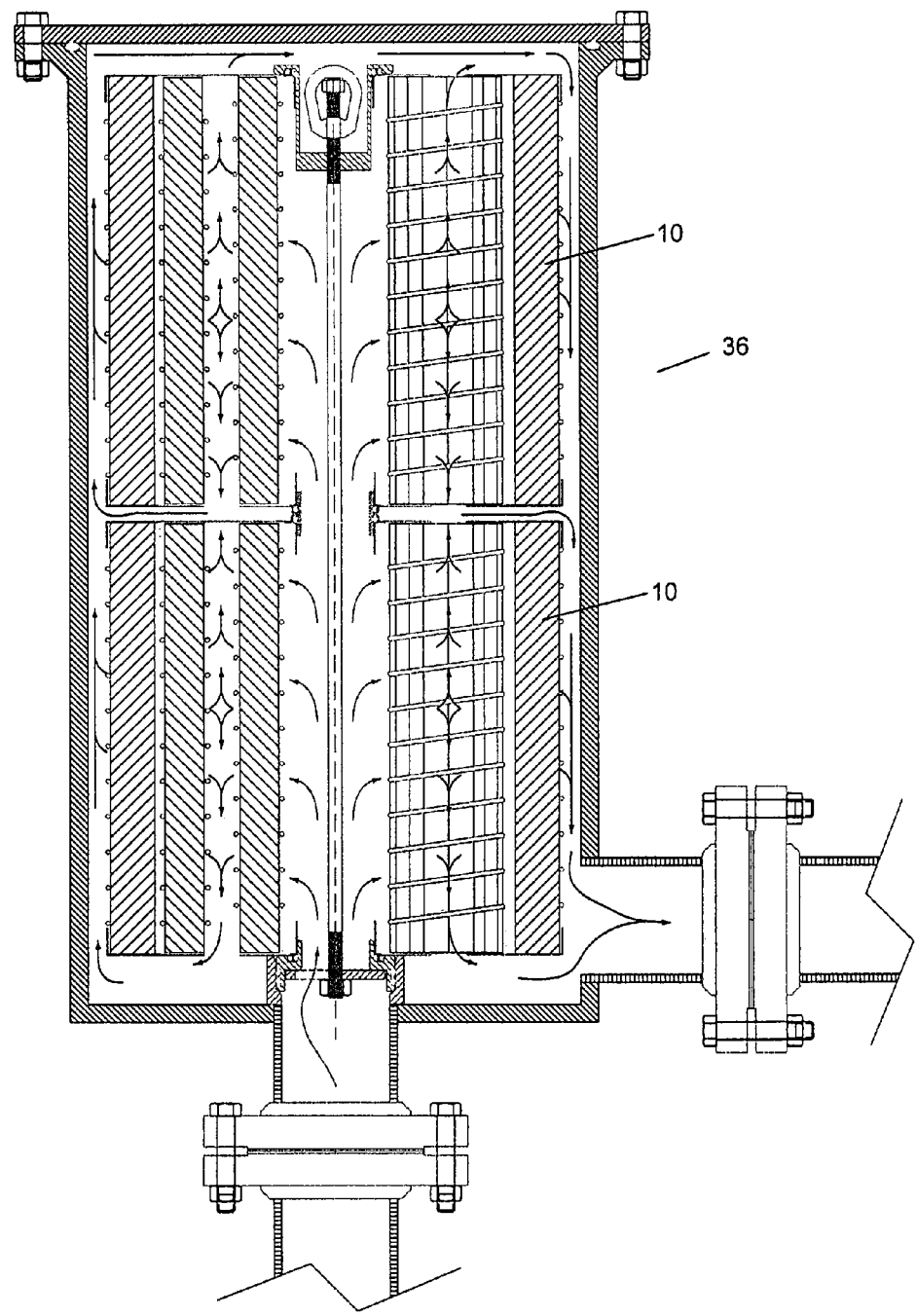
FIG. 7 is a cross-sectional side view of the filtration segment in a double stack arrangement with an inside-out flow path.

FIGS. 6 and 7 show an alternate embodiment of the current invention, wherein two filtration segments 10 are used with one being stacked on top of the other. FIG. 6 shows a normal flow pattern and FIG. 7 shows a reversed flow pattern. The flow patterns are described as above. The filtration segments 10 can be simply stacked upon each other. Alternatively, the filtration segments 10 can be secured by a stacking adaptor 70 or by any other means known in the art. Any number of filtration segments 10 can be used dependent upon the diameter, length and height of the housing 36.

Figure 8A:
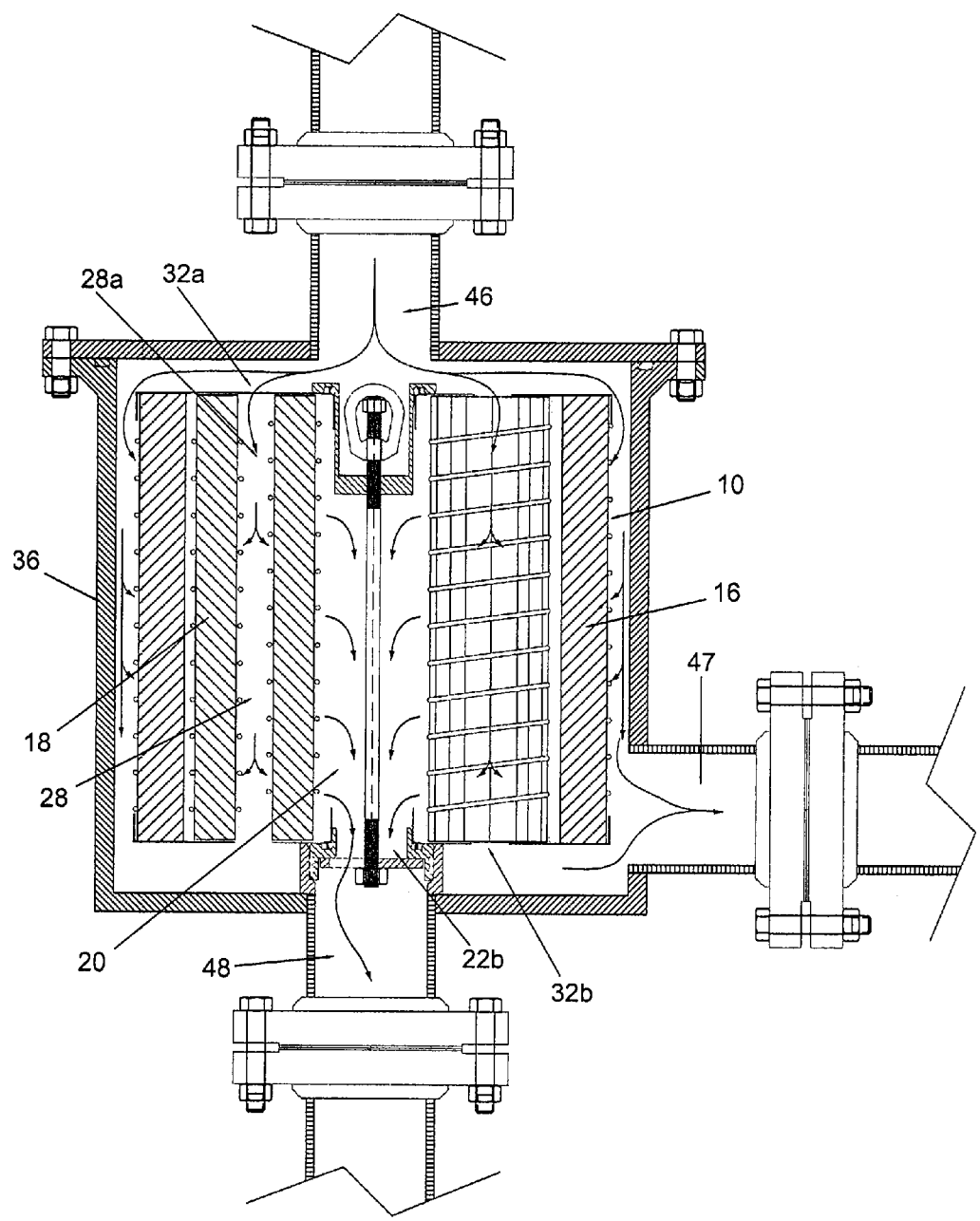
FIG. 8A is a cross-sectional side view of the filtration segment in a cross-flow configuration.
Figure 8B:
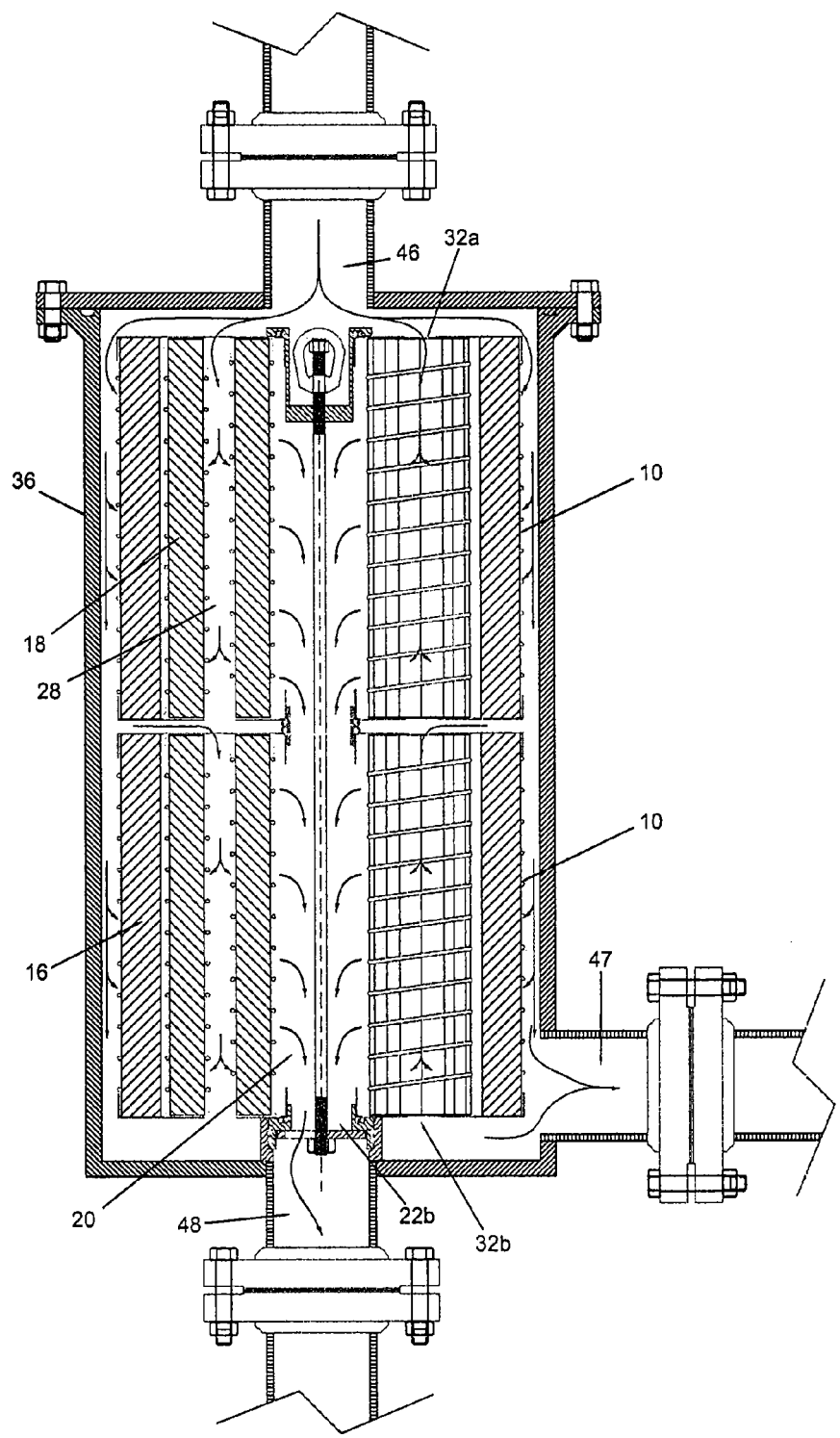
FIG. 8B is a cross-sectional side view of the filtration segment in a cross-flow configuration with a double stack arrangement.
Figure 8C:
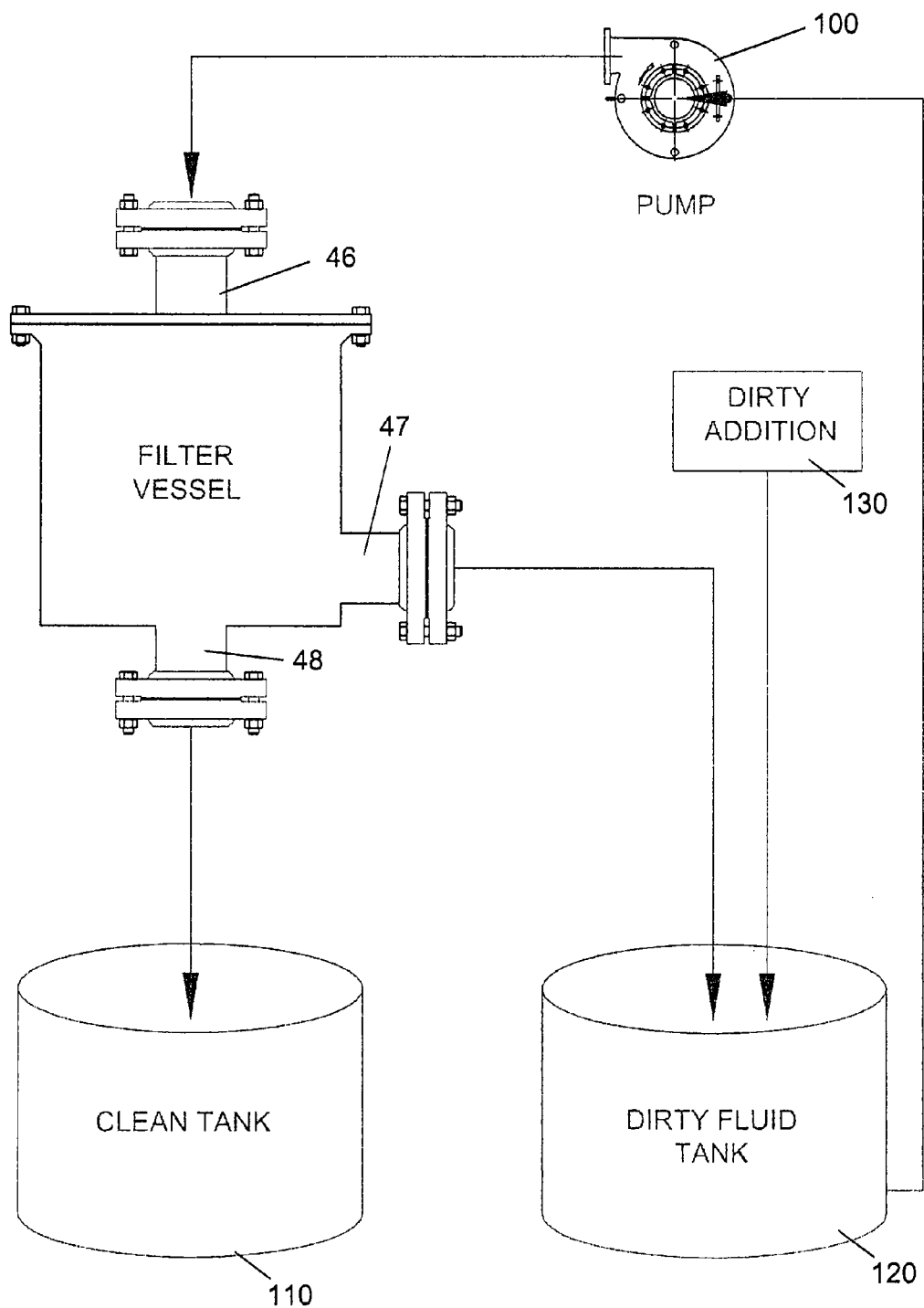
FIG. 8C is a schematic drawing showing the flow pattern of a filtration system in a cross-flow configuration.

FIGS. 8A, 8B and 8C show another alternate embodiment of the current invention, wherein only a portion of the fluid is filtered and the rest exits the filtration assembly unfiltered. This flow pattern is generally referred to as "cross-flow" configuration in the current invention. Specifically, FIG. 8A shows a "cross-flow" filtration assembly wherein only one filtration segment is used and FIG. 8B shows a "cross-flow" filtration assembly wherein two filtration segments 10 are stacked together. In both FIGS. 8A and 8B, fluid first enters the filtration segment 10 via the inlet 46. Thereafter, the fluid follows one of the following two paths.

A portion of the fluid enters openings as illustrated by 32*a* into the secondary filter cores 28*a* and passes through the interior filters 18, or flows along the inner walls of the housing 36 to the peripheral area surrounding the exterior filter 16 and then passes through the exterior filter 16. The filtered fluid is collected at the primary filter core 20 and exits the filtration segment 10 via the outlet 48.

The rest of the fluid flows along the inner walls of the housing 36 and exits the filtration segment 10 unfiltered via a "cross-flow" outlet 47, which, as shown in the current embodiment in FIG. 8A, is positioned at the lower right corner of the filtration segment 10.

FIG. 8C is a schematic drawing showing the flow pattern of a "cross-flow" configuration according to one embodiment of the invention. First, fluid to be filtered enters the filtration assembly via the inlet 46. A pump 100 can optionally be used to facilitate the process. A portion of the fluid is filtered and exits the filtration assembly via the outlet 48 and is collected in a clean tank 110. The rest of the fluid is not filtered and exits the filtration assembly via the "cross-flow" outlet 47. The unfiltered fluid is collected in a dirty fluid tank 120 and re-enters the filtration assembly via the pump 100 (optional) and the inlet 46. Additional dirty fluids can be added into the dirty fluid tank 120 from sources such as container 130, etc.

One benefit of the "cross-flow" configuration is its flexibility in filtering different types of fluids. The flow velocity and/or the filtration pressure can be adjusted and different influx/efflux ratios can be achieved. In some embodiments, it is preferable to have an influx/efflux ratio of about 1:1. In some other embodiments, it is preferable to have an influx/efflux ratio of about 10:1. Generally speaking, when the dirty fluid contains a substantial amount of solid impurities, a higher influx/efflux ratio may be preferred.

Figure 9:
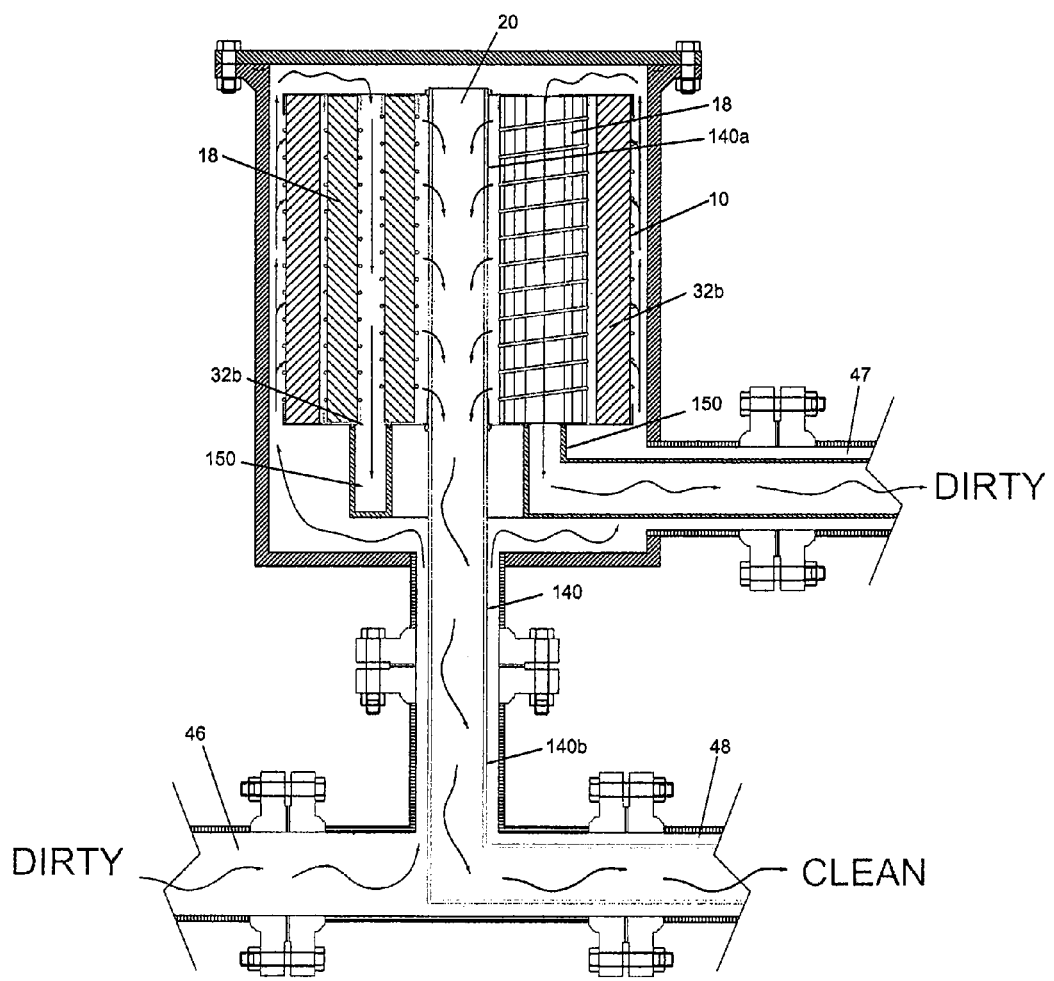
FIG. 9 is a cross-sectional side view of the filtration system in an alternate embodiment of a cross-flow configuration.

FIG. 9 shows another embodiment of the "cross-flow" configuration. Here, the inlet 46 and the outlet 48 are positioned at a substantially same level, and such level is relatively distant from the filtration assembly. On the other hand, the cross-flow outlet 47 is positioned at a location that is relatively proximate to the filtration assembly. Therefore, the filtration assembly can be positioned at a location that is distant from the influx/efflux pipeline, and the inlet 46 and outlet 48 can be more easily streamlined with other equipments of the plant In the particular embodiment as shown in FIG. 9, a primary tube 140 in the core 20 and one or more secondary tubes 150 are used to ensure the proper segregation of clean fluid from dirty fluid. The primary tube 140 comprises an upper portion 140a and a lower portion 140b. The upper portion 140a generally occupies the primary core 20 of the filtration segment 10 and is preferably fluid-permeable so that filtered fluids can enter into the tube and flow to the lower portion of the tube 140b. On the other hand, the lower portion of the tube 140b is preferably fluid-impermeable. It extends downwardly from the upper portion of the tube 140a until it reaches the level of the inlet 46 and the outlet 48, and then turns and exits the filtration assembly via outlet 48.

The secondary tubes 150 are attached to the bottom openings 32b of the secondary filters 18 and collect unfiltered fluid from openings 32b. The secondary tubes 150 form a circular concentric chamber that is in fluid communication with openings 32b below the bottom seal and surrounding the primary tube 140 and are in fluid communication with the filtration assembly via the "cross-flow" outlet 47. The secondary tubes and chamber formed by the tubes 150 is fluid-impermeable.

Figure 10:
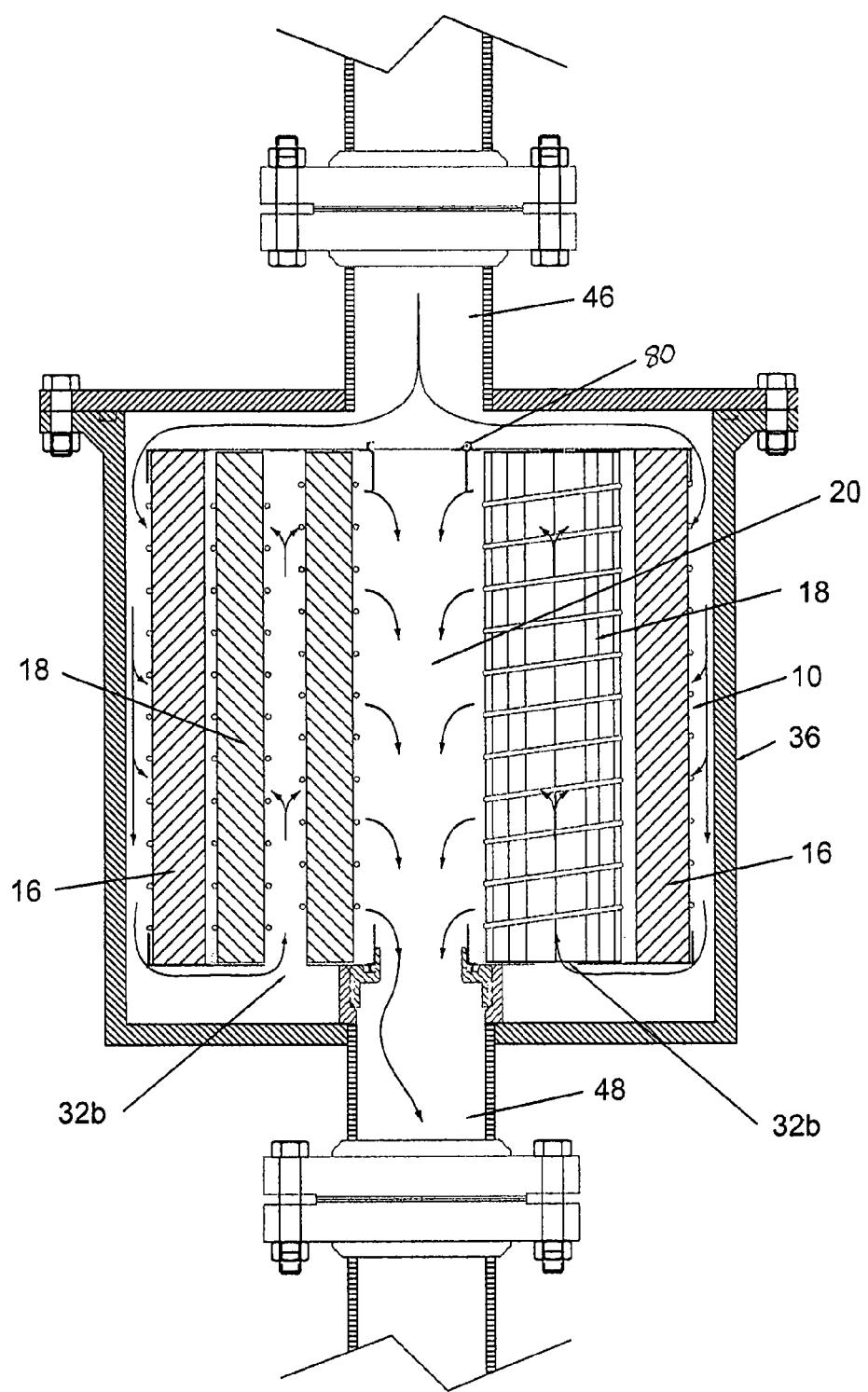
FIG. 10 is a cross-sectional side view of the filtration system in an alternate embodiment where the top seal is completely closed.

FIG. 10 shows yet another embodiment of the invention. In this embodiment, the top seal 80 contains no openings, and no rod or nut is used to assemble the filtration segment 10 to the housing 36. Fluid first enters from the inlet 46, flows along the top seal 12 to the peripheral area of the filtration segment 10. Thereafter, a portion of the fluid passes through the exterior filter 16 into the voids 50 (not shown) and eventually congregates at the primary core 20. The rest of the fluid enters the openings 32b at the bottom of the interior filters 18, passes the interior filters 18, and again congregates at the primary core 20. The filtered fluid eventually exits the filtration assembly via the outlet 48.

This invention is also for a new method of filtering fluid. The fluid flows around a generally cylindrical exterior layer of filter media and part of the fluid passes through the media. At the same time the remaining fluid passes through cores of generally cylindrical filter media inside the cylindrical exterior media allowing the fluid to pass outside the cores of the interior filters to a collection space inside the exterior layer. The filtered fluid is collected in the core spaces formed by the exterior wall of the cylindrical exterior layer of filter media and the exterior walls of the interior filters.

The reverse filter flow may also be used. The fluid to be filtered flows through the interior to the exterior of a generally cylindrical fluid permeable outer filter media layer allowing part of the fluid to pass through the filters media. At the same time fluid flows through the interior to the exterior of more than one generally cylindrical filter medias surrounded by the outer filter media so the fluid passes to the cores of the interior filter medias. The filtered fluid that passes through the outer filter media and interior filter media cores is collected.

While the invention has been described with respect to a limited number of embodiments, depending, for example, upon the fluid to be filtered, the pressure drop across the filter, and the direction of filtration, a virtually endless number of filter segments and filter assemblies may be employed. Also, the specific features of one embodiment should not be attributed to other embodiments of the invention and no single embodiment is representative of all aspects of the inventions. Moreover, variations and modifications therefrom exist. The appended claims intend to cover all such variations and modifications as falling within the scope of the invention.

What is claimed is:

1. A filtration segment for use in a filter housing comprising:
   a generally circular top seal member having a plurality of secondary openings surrounding a center axis of the filter housing;
   a generally circular bottom seal member having at least one primary opening at the center axis and a plurality of secondary openings corresponding to those on said top seal member;
   a generally cylindrical exterior filter composed of one or more layers of media extending between the outer edges of the top seal member and the outer edges of the bottom seal member;
   a primary filter core extending from the inside of the top seal member along the center axis through the filtration segment to the bottom seal member and in fluid communication to the filter housing;
   two or more interior filters spaced around the center axis, each interior filter comprising: a filter media surrounding a secondary core, said secondary cores of the interior filters extending from the top seal member to the bottom seal member and in fluid communication with each of the secondary openings in the top seal member and the bottom seal member with the fluid passing through the filter media of the interior filters flowing to the primary filter core and through the primary opening in the bottom seal for simultaneous filtration by the exterior and interior filters;
   said top seal member and bottom seal member preventing fluid from entering or exiting said filter segment other than through the secondary openings in the top seal member and the bottom seal member and the primary opening in bottom seal member.

2. A filtration segment of claim 1 wherein the exterior media is generally cylindrical and the top and bottom seal member are generally circular in shape.

3. A filtration segment of claim 1 further comprising one of a rigid or semirigid support surrounding the exterior filter media.

4. A filtration segment of claim 1 further comprising one of a rigid or semirigid support surrounding at least one of the interior filters.

5. A filtration segment of claim 1 wherein the primary filter core is the cylindrical space between the interior filters and between the top seal member and bottom seal member.

6. A filtration segment for use in a filter housing comprising:
   a generally circular top seal member having at least one primary opening at a center axis and a plurality of secondary openings surrounding said center axis;
   a generally circular bottom seal member having at least one primary opening and a plurality of secondary openings corresponding to said primary opening and said secondary openings on said top seal member;
   a primary filter core extending from the inside of the top seal member along said center axis through the filtration segment to the bottom seal member and in fluid communication with said at least one primary opening on both the top seal member and the bottom seal member for a fluid flow out of the filter housing;
   a generally cylindrical exterior filter composed of one or more layers of media extending between the outer edges of said top seal member and outer edges of said bottom seal member;
   two or more interior filters spaced around the center axis, each interior filter comprising: a filter media surrounding a secondary core and said secondary core of the interior filters extending from the top seal member to the bottom seal member and operatively coupled to at least one secondary opening for fluid flow on the top seal member and the bottom seal member to allow fluid flow into the interior filter; and wherein the filter segment providing simultaneous filtration fluid flow through the exterior filter and interior filters to the primary openings on the top seal member and bottom seal member; and a generally cylindrical exterior filter composed of one or more layers of media extending between the outer edges of said top seal member and outer edges of said bottom seal member.

7. A filtration segment of claim 6 wherein the exterior media is generally cylindrical and the top and bottom seals members are generally circular in shape.

8. A filtration segment of claim 6 further comprising one of a rigid or semirigid support surrounding the exterior filter media.

9. A filtration segment of claim 6 further comprising one of a rigid or semirigid support surrounding at least one of the interior filters.

10. A filtration segment of claim 6 further comprising securing adaptor located on the fluid openings of the primary core of the seal members for stacking the filter segments.

11. A filtration segment of claim 6 wherein the secondary cores are operatively connected and in fluid communication with a chamber extending from the bottom seal member, wherein the filtration segment further comprising:

an outlet from the chamber; and an outlet from the hollow volume for fluid flow.

* * * * *